(12) United States Patent
Aitken et al.

(10) Patent No.: US 7,330,634 B2
(45) Date of Patent: *Feb. 12, 2008

(54) CHALCOGENIDE GLASS FOR LOW VISCOSITY EXTRUSION AND INJECTION MOLDING

(75) Inventors: Bruce Gardiner Aitken, Corning, NY (US); Stephen Charles Currie, Corning, NY (US); Beth Costello Monahan, Painted Post, NY (US); Lung-Ming Wu, Horseheads, NY (US); Everett William Coonan, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/483,826

(22) Filed: Jul. 10, 2006

(65) Prior Publication Data

US 2006/0257097 A1     Nov. 16, 2006

Related U.S. Application Data

(62) Division of application No. 11/106,312, filed on Apr. 13, 2005, now Pat. No. 7,116,888.

(51) Int. Cl.
  *G02B 6/00*    (2006.01)
  *C03C 3/32*    (2006.01)
(52) U.S. Cl. .......................... 385/147; 501/40
(58) Field of Classification Search ............... None
  See application file for complete search history.

(56) References Cited

U.S. PATENT DOCUMENTS

| | | | |
|---|---|---|---|
| 4,481,023 A | 11/1984 | Marechal et al. | 65/64 |
| 4,734,118 A | 3/1988 | Marechal et al. | 65/102 |
| 4,747,864 A | 5/1988 | Hagerty et al. | 65/102 |
| 4,897,101 A | 1/1990 | Carpenter et al. | 65/64 |
| 4,929,265 A | 5/1990 | Carpenter et al. | 65/64 |
| 6,756,333 B2 * | 6/2004 | Aitken | 501/40 |

(Continued)

FOREIGN PATENT DOCUMENTS

JP    10-139454    5/1998

OTHER PUBLICATIONS

"Characteristics of Complex Non-Crystalline Chalocogenides From the Ge-As-S-Se-I System", S. R. Lukie, et al Chalcogenide Letters, vol. 1, No. 7, Jul. 2004, p. 91-104.
"Development and Applications of Chalcogenide Glass Optical Fibers at NRL", I. D. Aggarwal, et al Journal of Optolectronics and Advanced Materials, vol. 4, No. 3, Sep. 2002, p. 665-678.
"Chalcogenide Glasses for Optical and Photonics Applications", D. Lezal, et al Chalcogenide Letters, vol. 1, No. 1, Jan. 2004, p. 11-15.
"Melt crystallization of zinc alkali phosphate glasses", C. E. Crowder, et al Journal of Non-Crystalline Solids, 210, (1997) 209-223.

*Primary Examiner*—Sung Pak
*Assistant Examiner*—Hoang Tran
(74) *Attorney, Agent, or Firm*—Walter M. Douglas (57)    ABSTRACT

The invention is directed to chalcogenide glasses suitable for use in plastics forming processes. The glasses have the general formula YZ, where Y is Ge, As, Sb or a mixture of two or more of the sane; Z is Se, Te, or a mixture of Se+Te; and Y and Z are present in amounts (in atomic/element percent) in the range of Y=15-70% and Z=30-85%. The chalcogenide glasses of the invention have a 10,000 poise temperature of 400° C. and are resistant to crystallization when processed at high shear rates at their 10,000 poise temperature. The glasses can be used to make, among other items, molded telecommunication elements, lenses and infrared sensing devices.

15 Claims, 3 Drawing Sheets

U.S. PATENT DOCUMENTS

| | | | |
|---|---|---|---|
| 6,984,598 B1 | 1/2006 | Hilton, II | 501/37 |
| 7,116,888 B1 * | 10/2006 | Aitken et al. | 385/147 |
| 2003/0104918 A1 | 6/2003 | Aitken et al. | 501/42 |
| 2004/0079114 A1 | 4/2004 | Aitken et al. | 65/64 |

* cited by examiner

CHALCOGENIDE GLASS FOR LOW VISCOSITY EXTRUSION AND INJECTION MOLDING

This divisional application claims the priority of U.S. application Ser. No. 11/106,312, filed Apr. 13, 2005, now U.S. Pat. No. 7,116,888 entitled "Chalcogenide Glass For Low Viscosity Extrusion and Injection Molding."

FIELD OF THE INVENTION

The present invention relates to optical components and their manufacture using non-oxide glass materials. In particular, the invention relates to chalcogenide glasses that have low glass-transition temperatures ($T_g$), and can be processed by conventional plastics forming techniques such as injection molding, extrusion, embossing, thermoforming, blow-molding, rotational molding, and similar methods known in the art.

BACKGROUND OF THE INVENTION

Optical elements have had various uses in many diverse technologies, including sensors, image projectors, displays (e.g., liquid crystal displays (LCDs), plasma display, and electro-luminescence display), as well as opto-electronic devices for telecommunications. As the telecommunications industry itself develops, the need to develop precision optical elements that incorporate microstructures increases. In telecommunication devices, optical elements may be used, for example, in fiber and laser couplers, optical switches, or as diffraction gratings for WDM applications, and densely packed microlens arrays (MLAs) or networks for wavelength management modules or collimator applications. Precision optical elements require highly polished surfaces or exacting surface figures and qualities. The surfaces demand fabrication in proper geometric relationship to each other; and, where the elements are to be used in transmission applications, they will be prepared from a material of controlled, uniform, and isotropic refractive index.

Numerous methods and materials may be used to fabricate complex, precision optical elements. However, a great majority of conventional machining processes for manufacturing optical components are unsuited for producing very small features. Components having surface features or dimensions of 500 microns or smaller typically can be fabricated only through a few methods of limited applicability. The fabrication of microstructured surfaces using polymers is derived from processes developed by the semiconductor industry for making integrated circuits; for example, photolithography and ion etching techniques to create structures having sub-millimeter surface features. However, these methods are not suitable for large-scale manufacturing. The process time required to etch a microstructure is proportionally dependent on the required total depth of the microstructure. Moreover, not only are such methods expensive, but they can produce only a limited range of feature types. Etching processes are particularly worrisome because they can create rough surfaces. As a result, a smooth concave or convex profile, or true prismatic profiles, cannot be readily achieved using either of the two foregoing techniques.

Molding or hot embossing of plastics or glass materials, on the other hand, can form micron to sub-micron sized features. Plastics can conform to molds and reproduce faithfully intricate designs or fine microstructures. Unfortunately for many telecommunication applications, plastic materials are not ideal since they suffer from numerous shortcomings. For example, plastic materials have limited mechanical properties; are often not sufficiently robust to withstand, over time, environmental degradation; they exhibit large coefficients of thermal expansion (which can result in changes in volume and index of refraction); and it has been found that plastic optical devices often cannot withstand long exposure to humidity or high temperatures—all of which thereby limit the temperature range over which plastic optical devices may be useful.

Plastic materials, unlike the chalcogenide glasses of the present invention, also do not have complete transparency in the infrared ("IR"). As a result, one cannot use plastic materials to form a lens or other optical device in the IR range where the plastic absorbs. Further, plastics cannot transmit high-power light due to internal heating of the material that will cause a plastic component's surface features to degrade and its index of refraction to change—both of which are unacceptable in an optical context. In addition, since plastic materials for optical applications are available in only a limited range of dispersion and refractive indices, plastics can provide only a restricted transmission range. As a result, the usefulness of plastic materials, even within the restricted telecommunications bandwidth, is limited by the tendency to accumulate internal stresses; a condition that results in distortion of transmitted light during use. Many plastics also scratch easily and are prone to yellowing or developing haze and birefringence; and the application of abrasive-resistant and anti-reflective coatings still has not fully solved these flaws for plastic materials. Finally, many chemical and environmental agents degrade plastics, which make them difficult to clean effectively.

In comparison to plastics, glass possesses properties that make them more suitable for use as an optical material. Glass normally does not suffer from the material shortcomings of plastics, and it can better withstand detrimental environmental or operational conditions. Hence, glass is a more preferred material, and glass optical components represent a different class of devices than those made from plastics. However, the requirements of the molding processes that use glass are more stringent than those for plastics.

Precision optical elements of glass are customarily produced by one of two complex, multi-step processes. In the first method a glass batch is melted at high temperatures and the melt is formed into a glass body or gob having a controlled and homogeneous refractive index. Thereafter, the glass body may be reformed using repressing techniques to yield a shape approximating the desired final article. The surface quality and finish of the body at this stage of production, however, are not adequate for image forming optics. As a result, the rough article is fine annealed to develop the proper refractive index and the surface features are improved by conventional grinding and polishing practices. In the second method the glass melt is formed into a bulk body, which is immediately fine annealed, cut and ground into articles of the desired configuration. Both of these methods have their limitations. Grinding and polishing are restricted to producing relatively simple shapes, for example, flats, spheres, and parabolas. Other shapes and general aspheric surfaces are difficult to grind and complicated to polish. On the other hand, conventional techniques for hot pressing of glass do not provide the exacting surface features and qualities that are required for clear image forming or transmission applications. The presence of chill wrinkles in the surface and surface features are unacceptable defects.

Glass molding has also traditionally presented a number of other problems. Generally, to mold glass one must use high temperatures, typically greater than about 700° C. or 800° C., so as to make the glass conform or flow into a requisite profile as defined by a mold. However, at such relatively high temperatures glass becomes highly chemically reactive. Due to this reactivity highly refractory molds with inert contact surfaces are required for molding glass: for example, molds of silicon carbide, silicon nitride or other ceramic materials, intermetallic materials as iron aluminides, and hard materials as tungsten. However, in many cases such materials cannot attain sufficient surface smoothness for making satisfactory optical quality surface finishes. Precision optical elements require highly polished surfaces of exacting microstructure and quality. Metal molds can deform and re-crystallize at high temperatures, both of which can adversely affect the surface and optical qualities of the article being molded. This means additional costs to repair and maintain the molds, and higher defect rates in the product. Second, also due to the reactivity of the glass at high temperatures, the molding often must be carried out an inert atmosphere which complicates the process and increases costs. Third, the potential for air or gas bubbles to be entrapped in the molded articles is another drawback of high-temperature molding. Gas bubbles trapped within glass articles degrade the optical properties of the articles. The bubbles distort images and generally disrupt optical transmission. Fourth, even at high temperatures, hot-glass molding cannot create intricate, high-frequency, submillimeter microstructures such as those required for diffraction gratings.

Molded glass articles have also been described in U.S. Pat. Nos. 4,481,023, 4,929,265, 4,897,101, 4,747,864, and 4,734,118 (all assigned to Corning Glass Works, now Corning Incorporated). However, in these processes the molding is done by pressing (or compression molding) at ultra-high viscosities in the range of $10^8$-$10^{12}$ poise. For example, an aspheric lens can be formed using these processes by pressing a glass gob in a mold at approximately $10^9$ poise. The molding was done at these ultra-high viscosities in order to prevent crystallization of the glass. The molding processes used glasses having a composition such as that described in U.S. Pat. No. 4,323,654; which are alkali-$Ta_2O_5$—$B_2O_3$—$P_2O_5$ glass compositions. These are the type of compositions that were found to crystallize at high shear by C. E. Crowder et al., "Melt crystallization of zinc alkali phosphate glasses", *J. Non-Crystalline Solids*, V. 210 (1997), pages 209-223.

In the past, efforts have been made to develop molding techniques for manufacturing optical elements made of glass and/or new materials that can be used with existing techniques. The present invention disclosed glass materials suitable for the molding of glass elements having very-fine surface features; for example, features in the sub-micron range. The materials are chalcogenide glasses that can be processed by conventional plastics forming techniques such as injection molding, extrusion, embossing, thermoforming, blow-molding, rotational molding, and other methods known in the art.

SUMMARY OF THE INVENTION

The invention is directed to chalcogenide glass that can be extruded, injection molded, embossed, thermoformed, blow molded, rotational molded and otherwise formed using plastics processing equipment. The glasses of the invention have the general formula YZ; where Y is Ge, As, Sb or a mixture of two or more of the same; and Z is S, Se, Te, or a mixture of two or more of the same. The components of the chalcogenide glass of the invention are present in amount (in atomic or element percent) in the range of Y=15-70% and Z=30-85%. In addition, the glasses of the invention can also contain one or more of additional constituents such as Ga, P, Sn and In, each independently being in an amount in the range of 0-10%. Each composition totals 100%.

The invention is further directed to chalcogenide glasses that have a viscosity of approximately 10,000 poise or less at 500° C. or less, preferably 400° C. or less, and are resistant to crystallization when processed at high shear rates in the range of 1000-10,000 $sec^{-1}$.

The invention is further directed to optical elements made of chalcogenide glasses of general formula YZ; where Y is Ge, As, Sb or a mixture of two or more of the same; Z is S, Se, Te, or a mixture of two or more of the same; and Y and Z are present in amounts (in atomic or element percent) in the ranges of Y=15-70% and Z=30-85%. In addition the glass used to make the optical elements may contain one or more of additional constituents such as Ga, P, Sn and In, each independently being in an amount in the range of 0-10%. Each composition totals 100%.

The invention is also directed to a method of making optical elements by injection molding chalcogenide glasses of the general formula YZ; where Y is Ge, As, Sb or a mixture of two or more of the same; Z is S, Se, Te, or a mixture of two or more of the same; and Y and Z are present in amounts (in atomic or element percent) in the range of Y=15-70% and Z=30-85%. In addition, the glass used to make the optical elements according to the method of the invention may contain one or more of additional constituents such as Ga, P, Sn and In, each independently being in an amount in the range of 0-10%. Each composition totals 100%.

The invention is further directed to chalcogenide glass compositions that can be used in extrusion and injection molding processes. In particular, the glasses of the invention can be used in continuous screw-extrusion processes, as well as screw injection molding processes, traditionally used for low-cost manufacturing of plastic articles.

The invention is further directed to a method for making an optical element from a chalcogenide glass, the method having steps that include:

providing equipment used in conventional plastics forming techniques including injection molding, extrusion, embossing, thermoforming, blow-molding and rotational molding, and other plastic forming equipment known in the art;

providing a chalcogenide glass of general formula YZ; where Y is Ge, As, Sb or a mixture of two or more of the same; Z is S, Se, Te, or a mixture of two or more of the same; and Y and z are present in an amount (in atomic or element percent) in the range of Y=15-70% and Z=30-85%;

charging the particles to said selected equipment at a temperature sufficient for the chalcogenide glass to be a fluid having a a viscosity of less than 10,000 poise at a temperature of less than 500° C.;

forming the provided chalcogenide glass a precision optical element; and removing the optical element from said equipment.

In a preferred embodiment the chalcogenide glass that is provided has a viscosity of less than 10,000 poise at a temperature of less than 400° C.

DETAILED DESCRIPTION OF THE INVENTION

In reference to the compositions of the glasses described herein, all compositions are given in terms of atomic/element percentages.

As used herein the term "chalcogenide glass" means a non-oxide glass that contains at least one or more metals and one or more of the Group VIA elements sulfur, selenium and tellurium. Chalcogenide glasses generally transmit electromagnetic radiation (light) in the 500-20,000 nm range of the infrared spectrum.

The glasses of the invention have the general formula YZ; where Y is Ge, As, Sb or a mixture of two or more of the same; and Z is S, Se, Te, or a mixture of two or more of the same. The components of the chalcogenide glass of the invention are present in amount (in atomic or element percent) in the range of Y=15-70% and Z=30-85%; provided that when the chalcogenide glasses of the invention contain Ge in combination with one or both or As and Sb, the amount of Ge present in the mixed-metal composition is in the range $0<Ge\leq 20\%$.

The chalcogenide glasses of the invention may, optionally, contain one or more of additional metallic and/or non-metallic elements such as Ge, P, Sn and In, each independently being in an amount in the range of $0<(element)\leq 10\%$. Further metallic and non-metallic elements that can optionally be added to the chalcogenide glass include thallium (Tl), lead (Pb), bismsuth (Bi), silicon (Si), zinc (Zn), copper (Cu), silver (Ag), a halogen (F, Cl, Br or I, separately or in any combination), oxygen (O) and any of the lanthanide elements. Each of these additional optional elements can be independently added to the glass composition in an amount in the range of $0<(element)\leq 5\%$, except the lanthanide elements which, when present, are each independently added in an amount in the range of $0<(element)\leq 0.5\%$. Each composition totals 100%. By way of illustration, using as a base glass a composition containing 40% As (metallic element) and 60% S (non-metallic element) [see Table 1, 979BSL], one might prepare a glass containing as optional elements 1% Ga (metallic), 3% I (non-metallic) and 0.1% Er (metallic). The resulting glass would then have a metallic composition of 38.9% As, 1% Ga, and 0.1% Er (total metallic=40%), and a non-metallic composition of 5% I and 55% S (total non-metallic=60%); with the total composition equaling 100%.

The efficient, low-cost, low-temperature processes used to make a wide variety of plastic articles, for example, injection molding, have allowed organic polymer materials to replace glass in many technological applications. However, cost aside, glass articles would be preferred in many instances owing to their superior physical properties for certain applications. Some of the characteristics that make glass a superior material are: (1) they are harder than the corresponding plastic elements and thus less likely to scratch in use; (2) the temperature dependence of the refractive index glass is much lower than that of plastic materials; and (3) glasses are impermeable to moisture and gases. However, if it were possible to manufacture glass elements by the use of low-cost injection molding processes, such elements would be commercially competitive with their plastic counterparts. Examples of such elements include lenses, prisms, optical switches, diffraction gratings, couplers, sensors, optical fibers and other elements that can be used to sense, transmit, multiplex, demultiplex, amplify and otherwise manipulate and/or transmit light of selected wavelengths. The chalcogenide glasses described below are suitable for extrusion and for injection molding to make, for example without limitation, lenses, microlenses, an array of microlenses, fibers, diffraction grating, surface relief diffusers and fresnel lenses. The elements may have a fine or hyperfine structure in the sub-micron range; for example, the rulings present on a grating.

In typical plastic injection molding processes a thermoplastic material is injected under high pressure into a mold made of steel or other suitable material. After the material solidifies the mold is opened and a part having the shape of the mold is removed. A detailed description of the injection molding process, and the equipment used in the process can be found in the *Kirk-Othmer Encyclopedia of Chemical Technology* (electronic version), "Plastics Processing" by M. Xanthos and D. B. Todd, (John Wiley & Sons, © 2002, posted online Nov. 14, 2003), DOI (Digital Object Identifier) 10.1002/0471238961.161201192401.ao1.pub2, and the additional references and Kirk-Othmer Sections cited therein.

There are two basic types of injection molding: the "ram" process and the "screw" process. In the ram process, each stroke of the plunger pushes unmelted material into a heated cylinder, which in turn forces molten material, at the front of the cylinder, out through the nozzle and into the mold. In the screw process, unmelted granular material is conveyed forward, through a heated cylinder, by the rotation of an auger-type element. The material is converted to a viscous melt by the action of friction, and heat conducted from the cylinder. Molten material, in front of the screw, is injected into the mold by a separate plunger/ram or by the screw itself. Screw type injection molding machines have almost completely replaced plunger type machines, because of the superior mixing and process consistency of the screw process.

The injection molding process, as practiced by the polymer industry, is typically run at a maximum temperature of 500° C. (for certain high temperature materials) and preferably at a maximum temperature of 400° C. Therefore, in order for a glass to be injection molded, it is necessary that the glass have a 10,000 poise temperature of 400° C. or less, and that it be resistant to crystallization when processed at high shear rates (shear rates typically in the range of 1000-10,000 $sec^{-1}$) at its 10,000 poise temperature. Prior studies explored the possibility of extruding and injection molding metaphosphate and pyrophosphate glasses having low glass transition temperature ($T_g$). However, despite the absence of an obvious crystallization exotherm in differential scanning calorimetry, these metaphosphate and pyrophosphate glasses were invariably found to crystallize in the high shear environment of the extruder as explained by C. E. Crowder et al., "Melt crystallization of zinc alkali phosphate glasses", *J. Non-Crystalline Solids*, V. 210 (1997), pages 209-223. Furthermore, to the best of the inventors' knowledge, there is no published record of a truly successful, commercial application of low temperature (<400° C.) injection molding of glass. JP 10-139454 is titled "Injection Molding of Fluorophosphates-Based Optical Glass"; however, it only teaches a method of improving release of the glass from the mold surfaces, which is specific to halogen containing glass compositions. In addition, in JP 10-139454 the injection molding was done using a non-continuous, ram type process, which is far less cost-effective than the molding process demonstrated for the chalcogenide glass described in the present invention.

The present invention illustrates the shear thinning behavior of certain chalcogenide glasses which render them ideal materials for injection molding. In particular, for injection molding processes that produce optical elements than can be used in telecommunications operating at 1550 nm and in heat-sensors operating in the infrared range. On the basis of shear thinning behavior as measured on a capillary rheometer, as well as compatibility with standard metal fixtures at the processing temperatures, arsenic-rich selenide and sulfide glasses are identified as candidates for the injection molding of glass articles such as lenses capable of transmission at telecommunications wavelengths; for example, near-IR 1550 nm telecommunication band.

Table 1 lists the composition of various chalcogenide glasses made in accordance with the invention. The sample 979 BUG glass was unaffected after 1000 hours of exposure to 85% relative humidity at 85° C. (standard 85/85 test conditions used for evaluating telecommunication optical components). Other glasses are expected to exhibit similar durability. Table 1 lists the temperature at which capillary rheometer test results for shear thinning were obtained (right hand column, T° C. Ext/Mold). This temperature is approximately the temperature at which the glass has a viscosity of 10,000 poise. The rheometer test temperature also corresponds approximately to the appropriate extrusion/molding temperature.

TABLE 1

| Sample No. | Ge (At %) | As (At %) | Se (At %) | S (At %) | T, ° C. Ext/Mold | $\lambda_0$ (nm) |
|---|---|---|---|---|---|---|
| 979 BUE | 1.1 | 18.9 | 80 | | 230 | 818 |
| 979 BUF | 1.36 | 23.64 | 75 | | 280 | 820 |
| 979 BUG | 1.64 | 28.36 | 70 | | 300 | 821 |
| 979 BUH | 1.91 | 33.09 | 65 | | 340 | 818 |
| 979 BUI | 2.18 | 37.82 | 60 | | 360 | 824 |
| 979 BUJ | 2.4 | 42.6 | 55 | | 370 | 817 |
| 979 BLK | 11.67 | 11.67 | 76.67 | | 365 | 774 |
| 979 BLJ | 13.33 | 13.33 | 73.33 | | Not Tested | 770 |
| 979 BIK | 10 | 20 | 70 | | 380 | 789 |
| 979 BSL | 0 | 40 | 0 | 60 | 370 | 595 |

T, ° C. Ext/Mold = Rheometer testing temperature which corresponds, approximately, to both the extrusion/molding temperature and the 10,000 poise temperature.
$\lambda_0$ represents the absorption edge for the specified glass.

Figure 1:
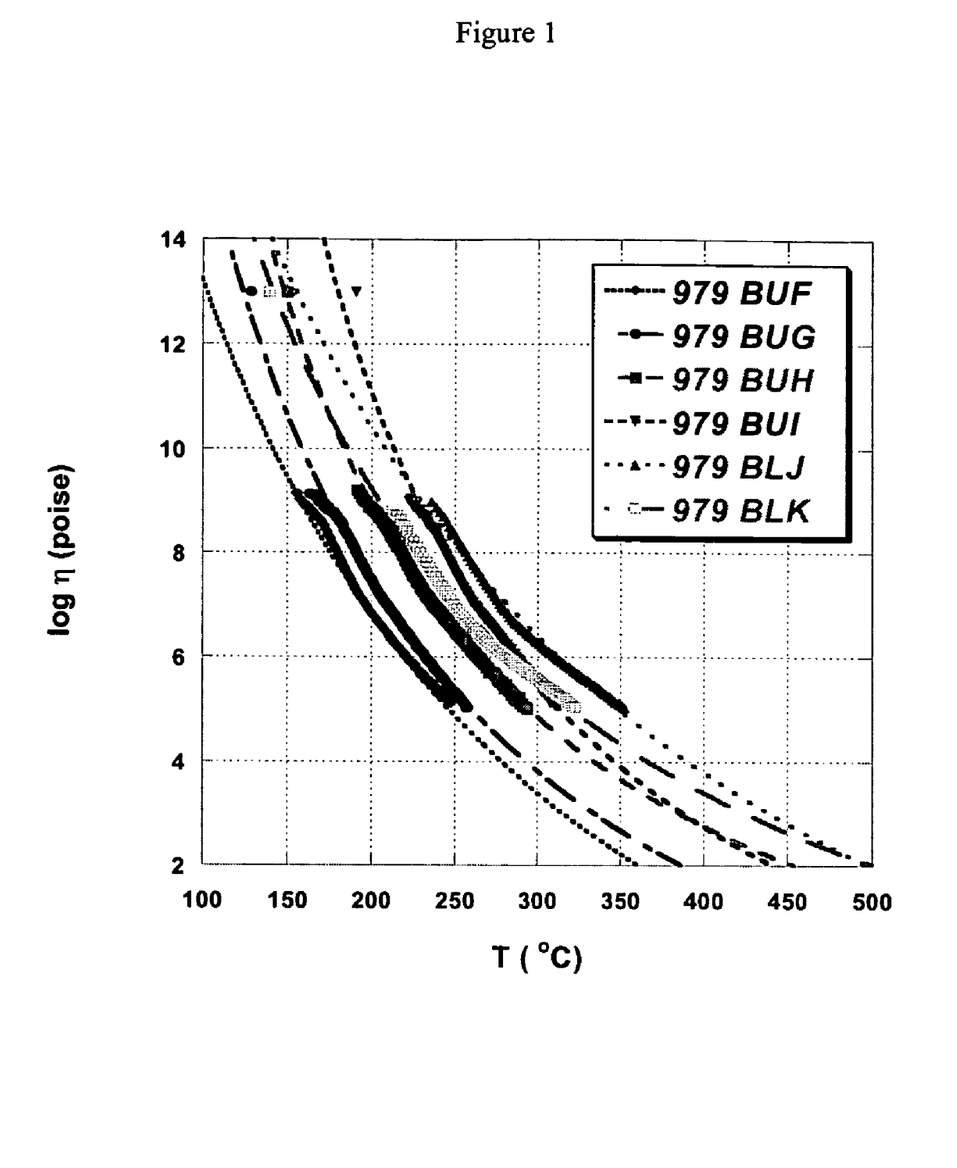
FIG. 1 is a graph illustrating the temperature dependence of the viscosity of the chalcogenide glasses listed in Table 1.

FIG. 1 illustrates the temperature dependence of the viscosity of the chalcogenide glasses listed in table 1. These glass all exhibit 10,000 poise temperatures less than 400° C. Two of the glasses, 979 BUF and 979 BUG exhibit 10,000 poise temperatures below 300° C., thus making them excellent candidates for injection molding processes, although the viscosity of the other glasses are all in a range suitable for melt processing.

Figure 2:
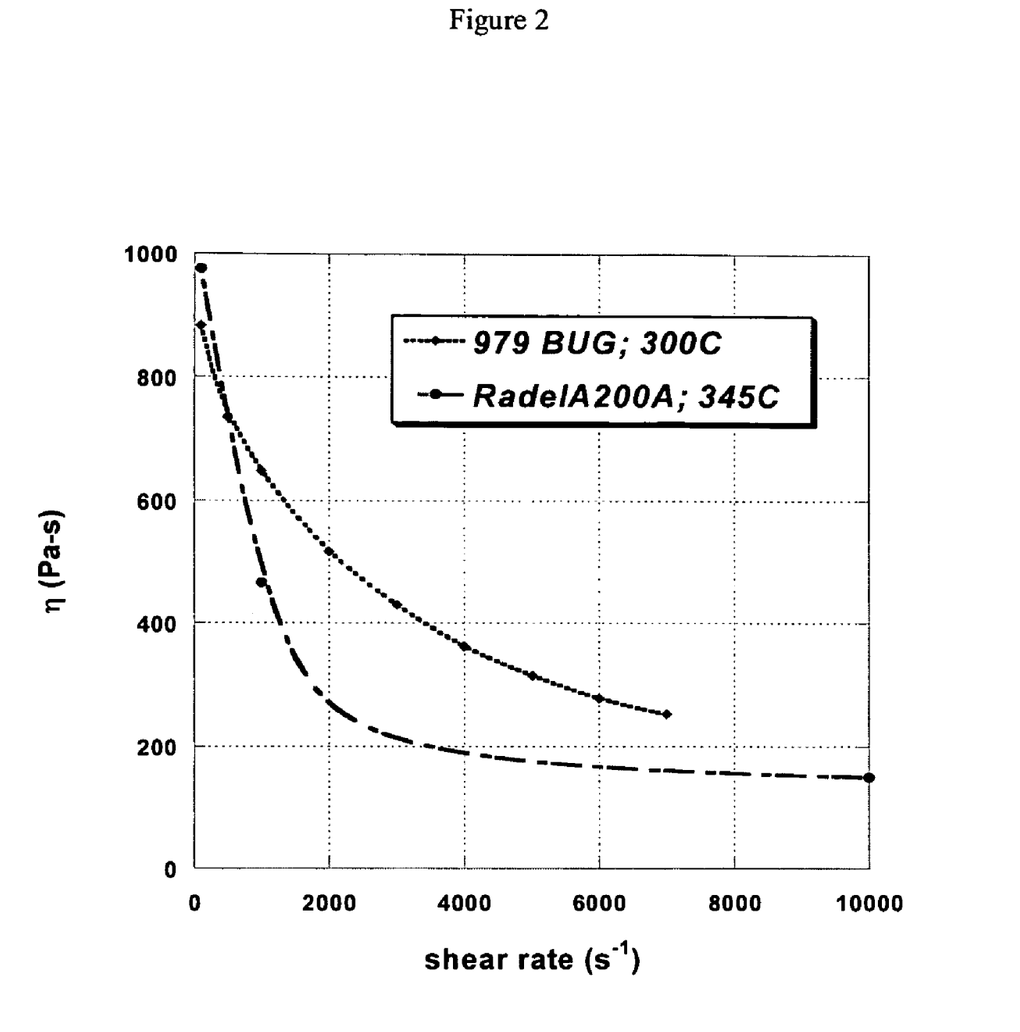
FIG. 2 is a graph illustrating the shear dependence of the viscosity ($\eta$) of the chalcogenide glass sample 979 BUG in comparison to an engineering plastic material (Radel A200A polysulfone).

FIG. 2 illustrates the shear dependence ($d\eta/d\dot{\gamma}$) of the chalcogenide glass 979 BUG as measured by capillary rheometry at 300° C., and compares the behavior of 979 BUG with that of the extrudable and injection-moldable polysulfone polymer Radel A200A as measured at 345° C. As can be seen from FIG. 1, the chalcogenide glass exhibits the shear thinning behavior characteristic of an extrudable and injection-moldable polymer material. In addition, there was no evidence for shear-induced crystallization of 979 BUG. Such crystallization would have been exhibited by an increase in viscosity at high shear rates.

Figure 3:
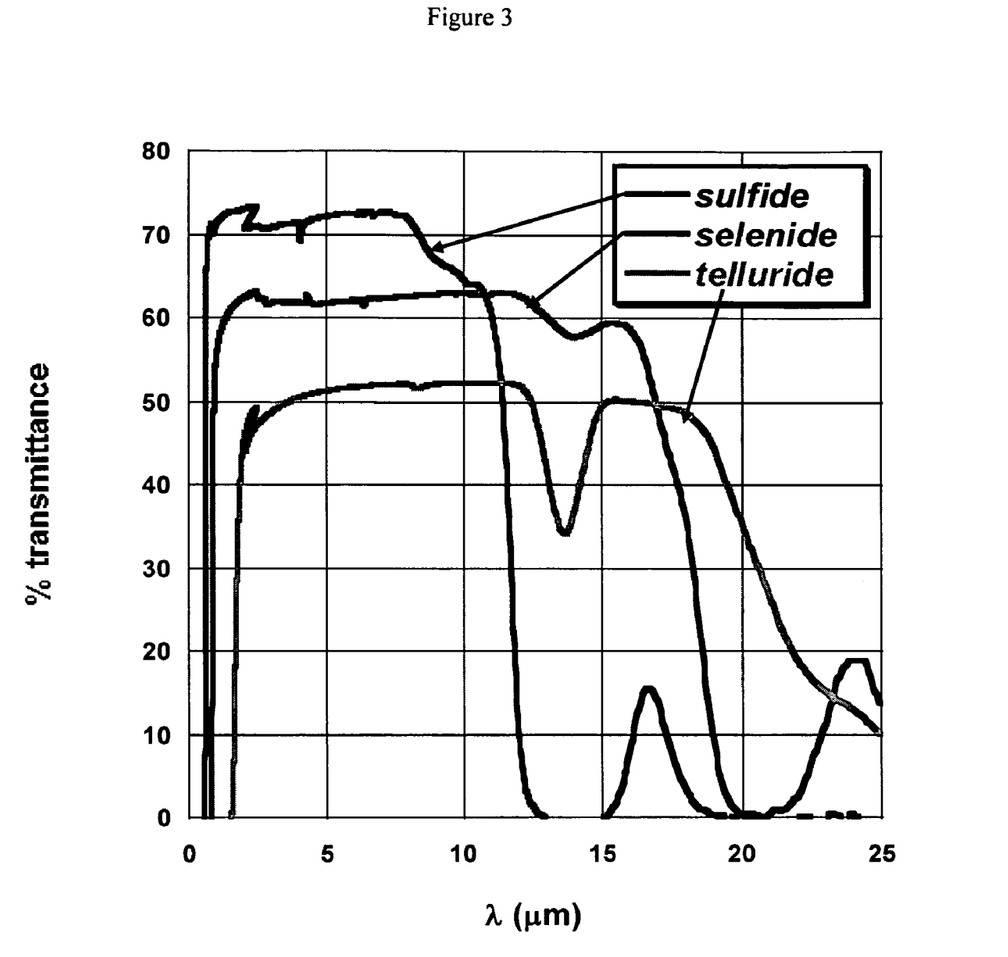
FIG. 3 is a graph illustrating the variations in % transmission vs. wavelength for chalcogenide glasses as a function of the chalcogen.

FIG. 3 is a graph illustrating %-transmission (uncorrected for Fresnel reflection losses) vs. wavelength for chalcogenide glasses as a function of the chalcogen (S, Se or Te). The graph indicates that all chalcogenide glasses are fully transmitting when the wavelength ($\lambda$) is in the approximate range of 2-12.5 μm. Sulfide glasses cut off (50% maximum transmittance) at approximately 12 μm; selenide glasses 17 μm; and, telluride glasses at approximately 22 μm.

The chalcogenide glasses of the invention can be made by mixing selected starting materials according to procedures known in the art. For example, the glasses can be made by melting the pure elements in quartz ampoules at melt temperatures in the range of approximately 600 to 1000° C. The glasses are then quenched and the resulting glass material is then broken into pieces, ground and sieved to a selected size range suitable for use in an extruder. The resulting material can be a powder or granules. If desired, fines and oversized particles can be recycled to subsequent preparations. Typical particle sizes are in the approximate range of 0.1-10 mm. However, generally particles used in the process of the invention are in the size range of 0.1-4 mm, with particles in the range 0.5-4 mm being preferred, and particles in the range of 1 to 2 mm being more preferred.

The resulting particles can then be charged to an extruder operating at a temperature sufficient for the resulting material to have a viscosity of less than 4000 poise at a shear rate in the range of 1000-10,000 $sec^{-1}$. For the chalcogenide glasses of the invention this temperature is less than 500° C. and preferably less than 400° C. Alternatively, to prevent the extruder from having to carry the full heating load, the particles may be pre-heated to a temperature in the range of 50-100° C. below the operating temperature of the extruder. As the material travels through the extruder, frictional heating and heat conducted into the barrel by heater bands will turn the glass from a solid into a viscous liquid that can be shaped. The material is shaped in the die and collected by appropriate take-off equipment. Alternatively, the extruder can feed the glass directly into an injection molding machine; however, this is a much more costly manufacturing option and the advantages of direct feeding are not apparent and have not been demonstrated.

EXAMPLE 1

By way of illustration not to be construed as limiting the invention, the chalcogenide glass 979 BUG was prepared and extruded in the following manner which is representative of the process of the invention. The equipment used in the following process is all commercially available.

A mixture, in atomic percent, of 1.6% Ge, 28.4% As and 70% Se was mixed together in an amount sufficient to prepare a 500 gram glass boule and placed in a quartz ampoule that was evacuated (to $10^{-3}$ mm Hg or less) and sealed. The ampoule was heated to a temperature of approximately 800° C. for a time in the range of 30-36 hours, slow cooled to 500° C., and then rapidly cooled (quenched) by immersing the ampoule in a 4000 ml beaker of room temperature water until the chalcogenide glass delaminated from the ampoule wall. At this point the ampoule was placed in an annealing furnace at an approximate temperature of 125° C. and held at this temperature for 0.25 to 2 hours. The furnace power was then turned off and the furnace was allowed to naturally cool to room temperature. The ampoule was then removed from the furnace and the chalcogenide glass removed from the ampoule.

Ten boules of the chalcogenide glass were prepared as described and crushed to particles in the size range of minus-20 mesh (0.8 mm maximum particle size). The particles were combined and the entire mass of 5000 grams was used in the following extrusion. The combined particles were analyzed and the glass was found to have the expected composition $Ge_{1.6}As_{28.4}Se_{70}$. It is to be understood that if the size of the boule being prepared is increased, the duration of the heating will also have to increase in order to insure that a homogeneous melt is produced. Generally, when doubling the size of the boule the time-at-temperature should increase by 40-60%. The particles were used in a screw-type extruder.

A K-tron loss-in-weight twin screw gravimetric feeder (K-tron Company, Pitman, N.J. USA) was used to feed the glass particles into a 30:1 L/D Wayne 1" single screw extruder (Wayne Machine & Dye Company, Totowa, N.J. USA). A single screw extruder was selected for the glass extrusion process because this type of extruder imparts less shear than twin screw extruders and researchers at Corning had previously determined that the viscosity increase associated with shear-induced crystallization could cause the screw to seize up in the barrel.

The extruder was equipped with a wear resistant screw and barrel to allow for the very abrasive nature of the glass in the transition section. The single stage, 2:1 compression ratio screw was boron nitride coated to provide the necessary slippage for conveying the glass down the barrel. The screw had a conical tip and a companion adaptor designed to eliminate the stagnant pool of molten material that typically sits at the screw tip on standard screws. This somewhat specialized tooling was selected to ensure that the glass wouldn't devitrify, however a standard tip and adaptor would probably have worked equally well as the glass showed no tendency to crystallize.

The processing conditions were such that the feed throat coolant was off; the barrel temperatures were approximately 293, 299, 305 and 305° C. (560, 570, 580 and 580° Fahrenheit) rear-to-front. The adapter temperature was set at 332° C. (630° Fahrenheit). No die was used. The glass was starve fed into the machine at approximately 2.27 Kg/hour (5 pounds/hour) to prevent exceeding the torque limits of the motor. At a screw speed of 20 rpm, the torque remained steady at 6 amps. The above conditions resulted in stable flow and a homogeneous melt which could easily be shaped into a continuous profile if a die (for example, tube, fiber sheet, etc.) were installed on the adaptor.

The glass industry has practiced the extrusion process for some time using ram extruders, but that process is fundamentally different than the process described above. Ram extruders (Advantek Engineering, Brimfield, Mass., USA) consist of a furnace with a single temperature controller that can go up to 1200° C. A sleeve that holds a billet of glass is lowered into the furnace and the glass is heated for a prolonged period of time (typically overnight) until the glass reaches a viscosity in the range of $10^6$-$10^{12}$ poise. A piston then forces the softened glass through a die. When the glass runs out, the furnace has to be cooled, recharged with another billet and then preheated again. The process is slow and discontinuous unlike the screw extrusion process practiced by the polymer industry and as illustrated in Example 1.

EXAMPLE 2

A two-cavity, double convex lens (25 mm diameter by 8 mm thick) mold was used to injection mold the 979BUG glass composition on an Arburg 370 CS 600-100 molding machine (Arburg, Inc., Newington, Conn.), which had a 30 mm diameter injection unit with a 2:1 compression-ratio screw. A thin layer of boron nitride, from water slurry, was applied to all surfaces of the screw, nozzle, sprue bushing, runner, gates and cavity to prevent adhesion of the glass. Crushed glass was sieved to a particle size range of approximately 0.5-2.0 mm, and placed in a standard hopper for flood feeding. Parts were molded at the following process conditions given in Table 2.

TABLE 2

| Position | Temp., ° C.: | Other Conditions | |
|---|---|---|---|
| Feed Throat | 52 | Clamp Force | 400 kN |
| Zone 1 | 293 | Shot Size | 15.00 ccm |
| Zone 2 | 299 | Switchover Point | 7.9 ccm |
| Zone 3 | 305 | Injection Speed | 20 ccm/sec. |
| Zone 4 | 305 | Switchover Pressure | 670 bar |
| Nozzle | 295 | Hold Pressure | 900 bar |
| Mold | 235 | Hold Time | 5.0 sec. |
| | | Circumfer. Screw Speed | 4.0 m/min. |
| | | Back Pressure | 30 bar |
| | | Cooling Time | 45 sec. |
| | | Total Machine Time | 59 sec. |

Sprue, runner and parts transferred, without problem, to the moving side of the mold. The sprue and runner released and ejected cleanly, but the lenses had to be tapped gently at their circumference, with a small, hard-rubber hammer to release them from the core pins. In spite of the fact that this was a very preliminary experiment, and did not represent optimized molding conditions, lenses that replicated the geometry and surface finish of the mold were produced consistently.

Prior to the first extrusion and molding trials, chalcogenide glass formulations 979 BUG, and 979 BSL listed in Table 1 were tested for compatibility with the metallurgy typically used in the construction of extruders and molding machines. No adverse reactions were observed. In addition, the glasses 979 BSL and 979 BUG showed no weight loss after 1000 hours in boiling water and no change in appearance after 100 hours of 85/85 testing. 979 BUG was tested at 300° C. in a capillary rheometer up to shear rates of 7000 $sec^{-1}$ and its viscosity decreased steadily from 9000 poise to 2500 poise with increasing shear rate. In addition, there was no crystallization. This is believed to be the first known example of a glass exhibiting shear thinning in the viscosity and temperature range generally used in polymer processing.

Additional capillary rheometry studies using As-rich GeAsSe glasses with As:Ge~17:1 indicate that shear thinning behavior extends from at least 60 to 80% Se. Rheometry data for As-poor samples such as 979 BIK (As:Ge=2:1, $T_g$=160° C. and 979 BLK (As:Ge=1:1, $T_g$=140° C.) indicate that these materials are sufficiently resistant to crystallization under shear that they can be used in extrusion/injection molding processes. These glasses were tested at 380 and 365° C., respectively, which is well within the 400° C. temperature limit usually encountered in polymer processing. For the ternary As—Ge—Se system of injection moldable glasses, the preferred ranges of for the individual components are 0-15% Ge, 0-45% As and 55-85% Se. The data for the sample 979 BSL, As=40%, S=60%, indicates that this formulation is also a suitable material for extrusion and injection molding processes. Further, in addition to having the good mid-IR transparency (800 to 12,000 nm) of the selenide glasses, 979 BSL also provides some transmission in the visible range of approximately 600 to 800 nm. The data for the chalcogenide glasses listed in Table 1 also suggests that quaternary systems such as As—Ge—Se—S and ternary systems such as As—Se—S will provide chalcogenide glasses suitable for extrusion and injection molding.

In addition to glasses using the chalcogenides S and Se, chalcogenide glasses can be made using tellurium (Te). These glasses can be made in the same manner as the glasses listed in Table 1. As shown in the FIG. 3, telluride glasses will have a different transmission range than the glasses made using S and Se. FIG. 3 illustrates the transmission range for a chalcogenide glass as a function of the chalcogenide element that is present. As shown in FIG. 3, there are over-lapping light transmission ranges for glasses made using a single, but different, chalcogenide element. By changing the glass composition to include more than one chalcogenide element, one can tailor the transmission range of a glass to meet a particular need.

The present invention has been described generally and in detail by way of examples and the figures and by way of examples of preferred embodiments. However, persons skilled in the art can appreciate that the invention is not limited necessarily to the embodiments specifically disclosed, but that substitutions, modifications, and variations may be made to the present invention and its uses without departing from the scope of the invention. Therefore, changes should be construed as included herein unless they otherwise depart from the scope of the invention as defined by the appended claims and their equivalents.

We claim:

1. Chalcogenide glasses, suitable for use in a variety of polymer forming processes including extrusion and injection molding, comprising glasses of general formula YZ; where Y is Ge, As, Sb or a mixture of two or more of the same; and Z is Se, Te, or a mixture of S and Te; and
    wherein Y is in the range of 15-70% and Z is in the range of 30-85%; and provided that when Ge is mixed with one or both of As and Sb, the amount of Ge is in the range of 0<Ge<25%, and
    wherein said glass has the composition, in atomic/element percent, of Ge=1.64%, As=28.36% and Se=70%, all values being ±10%.

2. The chalcogenide glass according to claim 1, wherein said glass, optionally, contains one or more of the elements selected from the group consisting of P, In, Sn and Ga;
    wherein when present, each of said elements P, In, Sn and Ga is independently present in an amount in the range of 0<(element)≦10%.

3. The chalcogenide glass according to claim 1, wherein said glass, optionally, contains one or more metallic and/or non-metallic elements selected from the group consisting of Tl, Pb, Bi, Zn, Si, Cu, Ag, O, a halogen, and one or a plurality lanthanide elements;
    wherein when present, each of said foregoing optional elements is independently present in an amount in the range of 0<(element)≦5%, except when said optional element is a lanthanide element said element is present in an amount in the range of 0<(lanthanide element)≦ 0.5%.

4. The chalcogenide glasses according to claim 1, wherein said glasses have a 10,000 poise temperature of less than 500° C.

5. The chalcogenide glasses according to claim 3, wherein said glasses have a 10,000 poise temperature of less than 400° C.

6. The chalcogenide glasses according to claim 4, wherein said glasses are resistant to crystallization when processed at shear rates in the range of 1000 to 10,000 sec$^{-1}$ at their 10,000 poise temperature.

7. The chalcogenide glasses according to claim 5, wherein said glasses are resistant to crystallization when processed at shear rates in the range of 1000 to 10,000 sec$^{-1}$ at their 10,000 poise temperature.

8. A method of making a chalcogenide glass precision optical element injection molding, said method comprising the steps:
    providing, in the form particles having a size in the range of 0.1 to 10 mm, a chalcogenide glass of general formula YZ; where Y is Ge, As, Sb or a mixture of two or more of the same; Z is Se, Te, or a mixture of S and Te; and Y and Z are present in amount (in atomic or element percent) in the range of Y=15-70% and Z=30-85%,
    charging the particles to an injection molding machine operating at a temperature sufficient for the particles to coalesce into a glass material having a viscosity of less than 10,000 poise at a temperature of less than 500° C.;
    molding the material into a precision optical element; and
    removing the precision optical element from the molding machine.

9. The method according to claim 8, wherein the particles coalesce into a glass material having a viscosity of less than 10,000 poise at a temperature of less than 400° C.

10. A method for making a chalcogenide glass optical element, said method comprising the steps of:
    providing equipment used in conventional plastics forming techniques, including injection molding, extrusion, embossing, thermoforming, blow-molding, and rotational molding, and other plastic forming equipment known in the art;
    providing a chalcogenide glass of general formula YZ; where Y is Ge, As, Sb or a mixture of two or more of the same; Z is Se, Te, or a mixture of S and Te; and Y and Z are present in an amount (in atomic or element percent) in the range of Y=15-70% and Z=30-85%;
    charging the particles to said selected equipment at a temperature sufficient for the chalcogenide glass to be a fluid having a viscosity of less than 10,000 poise at a temperature of less than 500° C.;
    forming the provided chalcogenide glass into an optical element; and
    removing the optical element from said equipment.

11. The method according to claim 10, wherein the chalcogenide glass that is provided has a viscosity of less than 10,000 poise at a temperature of less than 400° C.

12. The method according to claim 8, wherein said provided chalcogenide glass optionally includes one or a plurality of metallic and non-metallic elements selected from the group consisting of Ge, P, Sn and In, each metallic and non-metallic element being present in an amount (in atomic or element percent) in the range 0<(element)≦10%.

13. The method according to claim 8, wherein said provided chalcogenide glass optionally contains one or a plurality of metallic and non-metallic elements selected from the group consisting of Tl, Bi, Si, Zn, Cu, Ag, a halogen (F, Cl, Br, or I, alone or in any combination) and oxygen, and one or a plurality of lanthanide elements, each of which optional elements being independently present in an amount (in atomic or element percent) in the range 0<(element)

≦5%, except that the lanthanide elements, when present, are each independently present in an amount in the range of 0<(element)≦0.5%.

14. The method according to claim 10, wherein said provided chalcogenide glass optionally includes one or a plurality of metallic and non-metallic elements selected from the group consisting of Ge, P, Sn and In, each metallic and non-metallic element being present in an amount (in atomic or element percent) in the range 0<(element)≦10%.

15. The method according to claim 10, wherein said provided chalcogenide glass optionally contains one or a plurality of metallic and non-metallic elements selected from the group consisting of Tl, Bi, Si, Zn, Cu, Ag, a halogen (F, Cl, Br, or I, alone or in any combination), oxygen and one or a plurality of lanthanide elements, each of which optional elements being independently present in an amount (in atomic or element percent) in the range 0<(element)≦5%, except that the lanthanide elements, when present, are each independently present in an amount in the range of 0<(element)≦0.5%.

* * * * *